United States Patent Office 3,198,712
Patented Aug. 3, 1965

3,198,712
PROCESS FOR PRODUCING L-ASPARTIC ACID
Masahiro Takahashi and Yasoji Miura, Tokyo, Shinji Okumura and Moriyoshi Ishida, Kanagawa-ken, and Tetsuo Hino, Tokyo, Japan, assignors to Ajinomoto Co., Inc., Tokyo, Japan
No Drawing. Filed May 23, 1963, Ser. No. 282,585
Claims priority, application Japan, May 26, 1962, 37/21,524
19 Claims. (Cl. 195—30)

The present invention relates to processes for producing L-aspartic acid biochemically with high yields.

L-aspartic acid is one of the most important amino acids and has many uses in various fields.

Several processes for the preparation of L-aspartic acid are known. These include, for example, (1) chemical synthesis, (2) the isolation of L-aspartic acid from protein hydrolysate, and (3) the biochemical or fermentative production of L-aspartic acid from fumaric acid and a suitable amino donor.

The third of the above-listed processes is recognized as the most promising and practical process. However, no such process has been heretofore developed which produces L-aspartic acid on an industrial scale.

The present invention relates to the production of L-aspartic acid by the third method and has been rendered possible by the avoidance of many difficulties encountered in most conventional types of methods.

One of the problems usually encountered relates to the fact that an enzyme produced by a bacterium, a yeast, or a piece of tissue must generally be purified for use. As procedures for the purification of the enzyme are very complex, enzyme preparation, and especially the preparation of aspartase which is discharged in very small amounts into a culture broth, is very costly.

We have found that when a culture broth of *Pseudomonas trifolii* is added to a mixture of fumaric acid and ammonia, and the pH of the mixture is maintained within an alkaline range, fumaric acid is transformed to aspartic acid with a substantially high yield. In fact, the aspartase activity of *Pseudomonas trifolii* is so strong that purification treatment of the enzyme is not required.

The bacteria which can be employed in the present invention belongs to the species *Pseudomonas trifolii* and its characteristics can be found on page 180 of Bergey's Manual of Determinative Bacteriology; Seventh Edition (1957). *Pseudomonas trifolii* can be isolated from natural sources.

The present invention is based at least in part on our discovery that *Pseudomonas trifolii* have strong activity in producing L-aspartic acid from fumaric acid and ammonia. Among the many strains of *Pseudomonas trifolii* which exist, three strains, registered as ATCC 12287, ATCC 14537 and *Pseudomonas trifolii* B26–9–PY–5 Bergey's Manual of Determinative Bacteriology, 7th Edition (1957) pg. 180, have been found to have excellent activities for producing L-aspartic acid and these strains are preferable for use in connection with the invention.

The preferred process comprises mixing a culture broth of *Pseudomonas trifolii* with fumaric acid and ammonia, letting the mixture stand in approximately neutral condition, and recovering L-aspartic acid thusly formed from the mixture.

The preparation of the culture broth of *Pseudomonas trifolii* is not difficult or troublesome. A heavy culture of *Pseudomonas trifolii* is prepared by using a common nutritive medium at a pH range of 6 to 8 at 15–40° C. under aerobic conditions.

This common nutritive medium is composed of carbon sources, nitrogen sources, essential minerals and growth promoting substances.

A living cell suspension, treated cells such as dried cells, crude extract enzyme preparation or cell free extracts may also be used.

In Table I, which follows, the ability of various microorganisms to produce L-aspartic acid from fumaric acid is listed. Each microorganism was tested in an experiment performed as follows: 5 ml. of culture broth of each bacterium were added to 5 ml. of diammonium fumarate solution containing 5 g./dl. of fumaric acid. The pH of the mixture was adjusted to 7, and enzymation reaction was carried out at 37° C. for 48 hours. Bacterial growth was determined by measuring the absorbency of the culture medium at a wavelength of 562 millimicrons.

TABLE I

| Bacteria | Growth of bacteria | Residual fumaric acid | | Yield of L-aspartic acid formed | |
|---|---|---|---|---|---|
| | | G./dl. | Percent | G./dl. | Mole percent |
| *Bacillus megatherium* B-9-1 | 0.449 | 1.4 | 28 | 0.11 | 1.9 |
| *Escherichia coli* K-12 | 0.361 | 3.4 | 68 | 0.13 | 2.2 |
| *Aeromonas hydrophila* NRRL B-909 | 0.127 | 3.4 | 68 | 1.15 | 20.0 |
| *Serratia marcesens* 181-1 | 0.449 | 3.5 | 70 | 0.53 | 9.2 |
| *Pseudomonas aeruginosa* IFO 3455 | 0.650 | 1.0 | 20 | 0.45 | 7.8 |
| *Aerobacter aerogenes* ATCC 7256 | 0.418 | 0.5 | 10 | 3.09 | 54.0 |
| *Proteus volgaris* HX-19 | 0.283 | 0.5 | 10 | 2.28 | 39.7 |
| *Bacillus subtilis* NRRL B-558 | 0.388 | 1.7 | 34 | 0.19 | 3.3 |
| *Micrococcus flavus* ATCC 400 | 0.310 | 1.7 | 34 | 0.04 | 0.7 |
| *Alcaligenes faecalis* ATCC 101 | 0.545 | 0.9 | 18 | 0.33 | 5.7 |
| *Pseudomonas olevorans* ATCC 8062 | 0.648 | 1.2 | 24 | 0.50 | 8.7 |
| *Staphlococcus aureus* 209 | 0.409 | 1.0 | 20 | 0.02 | 0.3 |
| *Erwinia carotovora* IFO 3308 | 0.183 | 3.5 | 70 | 0.42 | 7.3 |
| *Agrobacterium tumefaciens* IFO 3058 | 0.591 | 3.3 | 66 | 0.06 | 1.1 |
| *Corynebacterium equi* B-271-1 | 0.309 | 1.8 | 36 | 0.01 | 0.2 |
| *Brevibacterium helvolum* ATCC 11822 | 0.562 | 1.4 | 28 | 0.11 | 1.9 |
| *Pseudomonas trifolii* ATCC 14537 | 0.458 | 0.2 | 4 | 5.74 | 100.8 |
| *Pseudomonas trifolii* ATCC 12287 | 0.412 | 0.2 | 4 | 5.56 | 97.9 |
| *Pseudomonas trifolii* B 26-9-PY-5 | 0.401 | 0.2 | 4 | 5.76 | 101.2 |

It can be seen from Table I that *Pseudomonas trifolii* have an excellent ability to transform fumaric acid into L-aspartic acid.

The enzymation reaction (i.e., the step of letting the mixture of the culture broth of *pseudomonas trifolii*, fumaric acid and ammonia stand) is carried out at a pH within the range of from 7 to 9 and at a temperature within the range of from 25 to 50° C. This reaction system is composed of fumaric acid or salts thereof, ammonia or ammonium salt and culture broth of *Pseudomonas trifolii*. Agitation or aeration is not necessary.

In this enzymation reaction, the optimum concentration of fumaric acid is about 4–40 g./100 ml. of the whole reaction mixture. An excessive addition of fumaric acid prolongs the reaction period. If fumaric acid alone is added to the culture broth of *Pseudomonas trifolii*, enzyme activity is lost because of the depression of pH value. Accordingly, fumaric acid should be carefully added together with basic agents such as ammonia and/or alkali to maintain a suitable pH value in the reaction system. Diammonium fumarate is preferred for use in the reaction.

Ammonia or ammonium compounds, such as aqueous solution of ammonia, ammonium chloride, ammonium sulfate and ammonium nitrate are used as the amino donor in the enzymation reaction. Gaseous ammonia or aqueous ammonia solution are preferred because they have no anion which inhibits the isolation of the aspartic acid produced. Aqueous solution of ammonia or gaseous ammonia may be used as a neutralizing agent in addition to constituting a favorable amino donor.

It is desirable that the enzymation reaction be carried out under anaerobic conditions, as agitation and aeration cause a decrease in yield of L-aspartic acid.

The enzymation reaction terminates within about 20–100 hours. The reacted solution contains L-aspartic acid in a concentration of 5–40 g./dl.

For the isolation of L-aspartic acid from the reacted mixture, well known methods can be applied. For instance, the solution can be centrifuged to remove the bacterial cells, whereafter the clear supernatant obtained is concentrated.

The concentrated solution is then acidified to the isoelectric point of L-aspartic acid (at a pH of about 2.5–3.5) and the crystals of L-aspartic acid precipitated from the solution are collected. More than 85% of the total L-aspartic acid contained in the reaction mixture is isolated as the first crop. The remaining L-aspartic acid can also be recovered from the mother liquor by subsequent concentration and cooling.

*Example 1*

A culture medium consisting of the following substances was prepared for the culture of *Pseudomonas trifolii*:

Glucose _____ 20 g.
Soybean hydrolysate containing 2.4 g./dl. of total nitrogen _____
KH$_2$PO$_4$ _____ 3 g.
MgSO$_4$·7 aq. _____ 0.1 g.
Water _____ to make 1 liter.

The pH of the medium was adjusted to 7.0, and the medium was sterilized at 110° C.

A strain of *Pseudomonas trifolii* ATCC No. 14537, cultured for 24 hours in a bouillon-agar medium, was inoculated into this medium. The medium was cultured with agitation for 18 hours at 30° C., the pH being maintained at 7.0 by the automatic supply of gaseous ammonia. The growth of bacteria reached a maximum after 18 hours, at which time the glucose in the medium was completely consumed. The enzymation reaction to produce L-aspartic acid followed the preparation of the culture broth. An aqueous solution of diammonium fumarate, prepared from 150 g. of fumaric acid and 175 ml. of a 28% aqueous solution of ammonia and diluted to 1 liter was mixed with 1 liter of the culture broth of the above *Pseudomonas trifolii*. The pH of the resultant solution was adjusted to 7.0 and the solution was incubated for 24 hours with neither shaking nor aeration. L-aspartic acid was accumulated during the incubation period and 8.6 g./dl. of L-aspartic acid was present at the end of the process. The L-aspartic acid produced was equivalent to 100.3 mol percent of diammonium fumarate charged by microbiological assay.

The reacted solution was acidified to pH 4 with hydrochloric acid, and the solution was decolorized with activated charcoal. The clear filtrate was concentrated in vaccuo, adjusted to pH 2.8, and left to stand overnight in an icebox. Crystals occurred and were collected and dried. They weighed 126 g. and the theoretical yield was 73.4%. The thus obtained crystals were determined to be L-aspartic acid by elemental analysis and determination of its optical rotation are shown below.

| | Found | Calculated |
|---|---|---|
| Nitrogen content by Kjeldahl's method, percent | 10.51 | 10.53 |
| $[\alpha]_D^{20}$, degrees | 24.5 | 24.6 |

*Example 2*

660 ml. of a culture broth of *Pseudomonas trifolii* ATCC No. 14537, prepared in the manner described in Example 1, were mixed with 1340 ml. of aqueous solution of diammonium fumarate containing 100 g. of fumaric acid. The mixture was adjusted to pH 7.4 and incubated at 37° C. for 25 hours. L-aspartic acid accumulated in an amount equivalent to 100.4 mol percent to added fumaric acid at the end of the reaction.

*Example 3*

One liter of a culture broth of *Pseudomonas trifolii* ATCC No. 14537 obtained in the manner described for Example 1 was mixed with 1 liter of aqueous solution of diammonium fumarate containing 200 g. of fumaric acid. The mixture was adjusted to pH 7.4 and incubated at 37° C. for 45 minutes. The yield of L-aspartic acid was equivalent to 87.4 mol percent to added fumaric acid.

*Example 4*

120 g. of fumaric acid were suspended in 400 ml. of water and dissolved with 140 ml. of a 28% aqueous solution of ammonia. 350 ml. of the culture broth of *Pseudomonas trifolii* ATCC No. 14537, prepared in the manner described in Example 1, were added to the diammonium fumarate solution, and the mixture was incubated for 16 hours at 37° C. The mixture was adjusted to pH 7.5 and diluted to 1 liter with water and then incubation was continued at 37° C. for 48 hours. All fumaric acid was transformed to L-aspartic acid. The reacted solution contained L-aspartic acid representing a yield of 98 mol. to the initial fumaric acid. The mixture was concentrated to 0.5 liter and acidified to pH 2.8 with concentrated hydrochloric acid. 150 g. of crude crystals of aspartic acid were collected from this solution. The crude crystals consisted of 83% L-aspartic acid. The main impurities of the obtained crystals were ammonium chloride, bacterial cells and their debris but no other amino acid beside L-aspartic acid could be detected. 115 g. of pure L-aspartic acid were obtained from the crude crystals by recrystallization, and was equivalent to 84 mol percent to the added fumaric acid. Analytical data and the value of optical rotation index of these crystals were satisfactory compared to that of L-aspartic acid.

*Example 5*

One liter of a culture broth of *Pseudomonas trifolii* ATCC No. 12287 was prepared in the same way as described in Example 1. 150 g. of fumaric acid and 175 ml. of a 28% ammonium hydroxide solution were mixed and the mixture was diluted to 1 liter with water. The culture broth was added to the mixture, and the pH of the resultant solution was adjusted to 7.4. The reaction was performed at 37° C. for 23 hours. 4.8 g./dl. of L-aspartic acid were found in the reacted solution by bio assay.

*Example 6*

A culture broth of *Pseudomonas trifolii* strain No. B26–9–PY–5 was prepared in the same way as that described in Example 1. One liter of the broth was mixed with 1 liter of diammonium fumarate solution prepared in the same way as that described in Example 1. The pH of the mixture was adjusted to 7.0 and the incubation was carried out at 37° C. for 23 hours. L-aspartic acid was produced in a concentration of 8.3 g./dl.

What is claimed is:

1. A process for producing L-aspartic acid which comprises mixing *Pseudomonas trifolii* with an aqueous solution containing a fumaric compound selected from the group consisting of fumaric acid and fumarate and an ammonia compound selected from the group consisting of ammonia and ammonium salt, maintaining the resulting mixture at approximately neutral condition whereby L-aspartic acid forms, and recovering L-aspartic acid from said admixture.

2. A process as claimed in claim 1 wherein *Pseudomonas trifolii* is used in one of the forms selected from the group consisting of a cultured broth, a living cell suspension, treated cells, a crude extract, an enzyme preparation and a cell-free extract.

3. A process as claimed in claim 1 wherein *Pseudomonas trifolii* is selected from the group consisting of ATCC 12287, ATCC 14537 and *Pseudomonas trifolii* B26–9–PY–5.

4. A process for producing L-aspartic acid comprising inoculating a culture medium with *Pseudomonas trifolii* B26–9–PY–5, adding to the medium a fumaric compound selected from the group consisting of fumaric acid and fumarate and an ammonia compound selected from the group consisting of ammonia and ammonium salts to bring the pH of the resulting reaction mixture to about 7.0–9.0 and incubating the reaction mixture under anaerobic and stationary conditions for about 20–100 hours and at about 25–50° C. while maintaining the pH thereof at about 7.0–9.0 to effect an enzymation reaction to produce L-aspartic acid.

5. A process for producing -aspartic acid comprising inoculating a culture medium with *Pseudomonas trifolii* ATCC No. 14537, adding to the medium a fumaric compound selected from the group consisting of fumaric acid and fumarate and an ammonia compound selected from the group consisting of ammonia and ammonium salts to bring the pH of the resulting reaction mixture to about 7.0–9.0, and incubating the reaction mixture under anaerobic and stationary conditions for about 20-100 hours and at about 25-50° C. while maintaining the pH thereof at about 7.0–9.0 to effect an enzymation reaction to produce L-aspartic acid.

6. A process for producing L-aspartic acid comprising inoculating a culture medium with *Pseudomonas trifolii* ATCC No. 12287, adding to the medium a fumaric compound selected from the group consisting of fumaric acid and fumarate and an ammonia compound selected from the group consisting of ammonia and ammonium salts to bring the pH of the resulting reaction mixture to about 7.0–9.0, and incubating the reaction mixture under anaerobic and stationary conditions for about 20-100 hours and at about 25–50° C. while maintaining the pH thereof at about 7.0–9.0 to effect an enzymation reaction to produce L-aspartic acid.

7. A process for producing L-aspartic acid comprising inoculating a culture medium with *Pseudomonas trifolii*, adding to the medium a fumaric compound and an amino donor, incubating the resulting reaction mixture under anaerobic and stationary conditions at about 25–50° C. while maintaining the pH thereof at about 7.0–9.0 to effect an enzymation reaction, and recovering L-aspartic acid from the reaction mixture.

8. A process for producing L-aspartic acid comprising inoculating a culture medium with *Pseudomonas trifolii*, adding to the medium a fumaric compound selected from the group consisting of fumaric acid and fumarate in an amount of about 4–40 g./100 ml. of said medium and an ammonia compound selected from the group consisting of ammonia and ammonium salts to bring the pH of the resulting reaction mixture to about 7.0–9.0, incubating the reaction mixture under anaerobic and stationary conditions for about 20–100 hours and at about 25–50° C. while maintaining the pH thereof at about 7.0–9.0 to effect an enzymation reaction, centrifuging the solution to remove the *Pseudomonas trifolii* therefrom and to obtain a supernatant fluid, concentrating the supernatant fluid and acidifying the same to a pH of about 2.5–3.5 to precipitate L-aspartic acid crystals, recovering said crystals, and concentrating and cooling the remaining fluid to recover the remaining L-aspartic acid.

9. A process for producing L-aspartic acid comprising inoculating a culture medium with a strain of *Pseudomonas trifolii*, incubating the resulting reaction mixture under anaerobic and stationary conditions for about 20–100 hours and at about 25–50° C. while maintaining the pH thereof at about 7.0–9.0 to effect an enzymation reaction, and recovering L-aspartic acid from the thusly reacted reaction mixture.

10. A process for producing L-aspartic acid comprising inoculating a culture medium with a strain of *Pseudomonas trifolii* selected from the group consisting of ATCC No. 12287, ATCC No. 14537 and B26–9–PY–5, adding to the medium a fumaric compound and an ammonia compound, incubating the resulting reaction mixture under anaerobic conditions for about 20–100 hours while maintaining the pH thereof at about 7.0–9.0 to effect an enzymation reaction, and recovering L-aspartic acid from the reaction mixture.

11. A process for producing L-aspartic acid comprising inoculating a culture medium with a strain of *Pseudomonas trifolii* selected from the group consisting of ATCC No. 12287, ATCC No. 14537 and B26–9–PY–5, adding to the medium a fumaric compound and an ammonia compound, incubating the resulting reaction mixture under anaerobic and stationary conditions while maintaining the pH thereof at about 7.0–9.0 to effect an enzymation reaction, and recovering L-aspartic acid from the reaction mixture.

12. A process for producing L-aspartic acid comprising inoculating a culture medium with a strain of *Pseudomonas trifolii* selected from the group consisting of ATTC No. 12887, ATCC No. 14537 and B26–9–PY–5, adding to the medium a fumaric compound and an ammonia compound, incubating the resulting reaction mixture under anaerobic and stationary conditions at about 25–50° C. while maintaining the pH thereof at about 7.0–9.0 to effect an enzymation reaction, and recovering L-aspartic acid from the reaction mixture.

13. A process for producing L-aspartic acid comprising inoculating a culture medium with a strain of *Pseudomonas trifolii* selected from the group consisting of ATCC No. 12287, ATCC No. 14537 and B26–9–PY–5 and an ammonia compound, incubating the resulting reaction mixture under anaerobic and stationary conditions for about 20–100 hours and at about 25–50° C. while maintaining the pH thereof at about 7.0–9.0 to effect an enzymation reaction, and recovering L-aspartic acid from the reaction mixture.

14. A process comprising mixing into a culture medium having therein a strain of *Pseudomonas trifolii* selected from the group consisting of ATCC No. 12287, ATCC No. 14537 and B26–9–PY–5, a fumaric compound selected from the group consisting of fumaric acid and fumarate in an amount of about 4–40 g./100 ml. of said medium and an ammonia compound selected from the group consisting of ammonia and ammonium salts, incubating the resulting reaction mixture under anaerobic and stationary conditions for about 20–100 hours and at about 25–50° C. while maintaining the pH thereof at about 7.0–9.0 to effect an enzymation reaction, and recovering L-aspartic acid from the reaction mixture.

15. A process for producing L-aspartic acid comprising inoculating a culture medium including carbon and nitrogen sources with a strain of *Pseudomonas trifolii* selected from the group consisting of ATCC No. 12287, ATCC No 14537 and B26–9–PY–5, adding to the medium a fumaric compound selected from the group consisting of fumaric acid and fumarate in an amount of about 4–40 g./100 ml. of said medium and an ammonia compound selected from the group consisting of ammonia and ammonium salts to bring the pH of the resulting reaction mixture to about 7.0–9.0, incubating the reaction mixture under anaerobic and stationary conditions for about 20–100 hours and at about 25–50° C. while maintaining the pH thereof at about 7.0–9.0 to effect an enzymation reaction, centrifuging the solution to remove the *Pseudomonas trifolii* therefrom and to obtain a supernatant fluid, concentrating the supernatant fluid and acidifying the same to a pH of about 2.5–3.5 to precipitate L-aspartic acid crystals, recovering said crystals, and concentrating and cooling the remaining fluid to recover the remaining L-aspartic acid.

16. A process for producing L-aspartic acid comprising inoculating a culture medium including carbon and nitrogen sources with a strain of *Pseudomonas trifolii* selected from the group consisting of ATCC No. 12287, ATCC No. 14537 and B26–9–PY–5 and in one of the forms selected from the group consisting of a culture broth, a living cell suspension, treated cells, a crude extract, an enzyme preparation and a cell-free extract, culturing the thusly inoculated medium until the growth of said strain reaches a maximum, adding to the medium a fumaric compound selected from the group consisting of fumaric acid and fumarate in an amount of about 4–40 g./100 ml. of said medium and an ammonia compound selected from the group consisting of ammonia and ammonium salts to bring the pH of the resulting reaction mixture to about 7.0–9.0, incubating the reaction mixture under anaerobic and stationary conditions for about 20–100 hours and at about 25–50° C. while maintaining the pH thereof at about 7.0–9.0 to effect an enzymation reaction, centrifuging the solution to remove the *Pseudomonas trifolii* therefrom and to obtain a supernatant fluid, concentrating the supernatant fluid and acidifying the same to a pH of about 2.5–3.5 to precipitate L-aspartic acid crystals, and recovering said crystals.

17. A process for producing L-aspartic acid comprising inoculating a culture medium including carbon and nitrogen sources and minerals and growth producing substances with a strain of *Pseudomonas trifolii* selected from the group consisting of ATCC No. 12287, ATCC No. 14537 and B26–9–PY–3 and in one of the forms selected from the group consisting of a culture broth, a living cell suspension, treated cells, a crude extract, an enzyme preparation and a cell-free extract, culturing the thusly inoculated medium until the growth of said strain reaches a maximum, adding to the medium a fumaric compound selected from the group consisting of fumaric acid and fumarate in an amount of about 4–40 g./100 ml. of said medium and an ammonia compound selected from the group consisting of ammonia and ammonium salts to bring the pH of the resulting reaction mixture to about 7.0–9.0, incubating the reaction mixture under anaerobic and stationary conditions for about 20–100 hours and at about 25–50° C. while maintaining the pH thereof at about 7.0–9.0 to effect an enzymation reaction, centrifuging the solution to remove the *Pseudomonas trifolii* therefrom and to obtain a supernatant fluid, concentrating the supernatant fluid and acidifying the same to a pH of about 2.5–3.5 to precipitate L-aspartic acid crystals, recovering said crystals, and concentrating and cooling the remaining fluid to recover the remaining L-aspartic acid.

18. A process as claimed in claim 17 wherein the ammonia compound is gaseous.

19. A process as claimed in claim 17 wherein the ammonia compound is in aqueous solution.

References Cited by the Examiner

UNITED STATES PATENTS 2,971,890  2/61  Ogawa et al. _____ 195—30

FOREIGN PATENTS 880,234  10/61  Great Britain.

A. LOUIS MONACELL, *Primary Examiner.*